(12) United States Patent
Gibney et al.

(10) Patent No.: US 10,170,994 B1
(45) Date of Patent: Jan. 1, 2019

(54) VOLTAGE REGULATORS FOR AN INTEGRATED CIRCUIT CHIP

(71) Applicant: Advanced Micro Devices, Inc., Sunnyvale, CA (US)

(72) Inventors: Thomas J. Gibney, Newton, MA (US); Larry D. Hewitt, Austin, TX (US); Daniel L. Bouvier, Bee Cave, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/682,900

(22) Filed: Aug. 22, 2017

(51) Int. Cl.
*H02M 3/158* (2006.01)
*H02M 3/139* (2006.01)

(52) U.S. Cl.
CPC ......... *H02M 3/1582* (2013.01); *H02M 3/139* (2013.01)

(58) Field of Classification Search
CPC ...... H02M 3/158; H02M 3/155; H02M 3/156; H02M 3/1582; H02M 3/157; G05F 1/614; G05F 1/618; G05F 1/40; G05F 1/44
USPC ....... 323/224, 225, 265, 267, 282, 283, 349, 323/351
See application file for complete search history.

(56) References Cited

U.S. PATENT DOCUMENTS

| | | | | |
|---|---|---|---|---|
| 2005/0040807 A1* | 2/2005 | Chen | .................. | G05F 1/56 323/315 |
| 2011/0243216 A1* | 10/2011 | Yoshioka | .............. | H02M 3/157 375/238 |
| 2011/0298280 A1* | 12/2011 | Homol | ...................... | H03F 3/72 307/31 |
| 2015/0137598 A1* | 5/2015 | Hawawini | .............. | G01R 31/00 307/31 |

* cited by examiner

*Primary Examiner* — Adolf Berhane
(74) *Attorney, Agent, or Firm* — Park, Vaughan, Fleming & Dowler LLP (57) ABSTRACT

The described embodiments include an apparatus that controls voltages for an integrated circuit chip having a set of circuits. The apparatus includes a switching voltage regulator separate from the integrated circuit chip and two or more low dropout (LDO) regulators fabricated on the integrated circuit chip. During operation, the switching voltage regulator provides an output voltage that is received as an input voltage by each of the two or more LDO regulators, and each of the two or more LDO regulators provides a local output voltage, each local output voltage received as a local input voltage by a different subset of circuits in the set of circuits.

19 Claims, 6 Drawing Sheets

VOLTAGE REGULATORS FOR AN INTEGRATED CIRCUIT CHIP

BACKGROUND

Related Art

In some integrated circuit systems, voltage regulators are used to supply electrical power at specified voltages to some or all of the integrated circuits. For example, voltage regulators can be used to supply electrical power at specified voltages to a system on a chip integrated circuit that includes central processing unit (CPU) cores and graphics processing unit (GPU) cores. While voltage regulators can be used to supply electrical power to integrated circuits, the use of voltage regulators introduces cost and complexity to system design. In addition, the use of voltage regulators can result in power efficiency losses, which may reduce battery life in devices that rely on batteries for power and reduce performance within a given power envelope.

One arrangement of voltage regulators consists of a single-stage array of buck regulators (i.e., buck converter circuits) in which each of a set of external buck regulators is allocated for supplying electrical power to a corresponding partition of the integrated circuits (e.g., CPU core, GPU core, etc.). For example, each of the "external" buck regulators may be mounted to a circuit board along with a chip package that encloses an integrated circuit chip on which the integrated circuits are located. By providing a separate buck regulator for each partition, this arrangement of voltage regulators enables the dynamic selection of a voltage for each partition. One disadvantage of this arrangement, however, is that the arrangement must be provisioned with buck regulators that are able to provide a maximum power for the corresponding partition. Because it is rare that the partitions demand maximum power, the buck regulators, which operate most efficiently at higher currents (and corresponding power levels), often operate at inefficient lower currents. In addition, provisioning buck regulators as described results in increased circuit board and package cost, as the circuit board and package must be configured with resources for handling the sum of the maximum electrical currents for each of the partitions.

Another arrangement of voltage regulators consists of two stages of voltage regulators, with an external first stage buck regulator providing a fixed intermediate voltage to an array of second stage buck regulators that are fabricated on an integrated circuit chip along with the integrated circuits. Each second stage buck regulator provides dynamically selectable voltages to a particular partition of the integrated circuits (e.g., CPU core, GPU core, etc.). The fixed intermediate voltage is a relatively high voltage level compared to typical integrated circuit voltage requirements, and thus the second stage buck regulators convert/reduce the fixed intermediate voltage to operational integrated circuit voltages for the corresponding partition. In this arrangement of voltage regulators, currents can be provisioned for realistic maximum current scenarios since the first stage regulator and circuit board/package resources are shared by the second stage buck regulators. One disadvantage of this arrangement, however, is that the second stage buck regulators are complex and costly to integrate and fabricate on the integrated circuit chip.

As described above, the various existing arrangements of voltage regulators for providing power to integrated circuits has significant shortcomings. Improving the arrangement and use of voltage regulators is therefore a concern.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that the term may have significant additional aspects that are not recited herein for clarity and brevity and thus the description is not intended to limit the term.

Supply voltage: a supply voltage is an electrical signal that is supplied to one or more circuits, e.g., individual transistors, collections of transistors forming various logic gates or circuits, discrete circuit elements, functional blocks, etc., to be used to enable the circuits to operate. In some cases, the supply voltage is supplied at a substantially steady voltage, but with a current that varies as an electrical demand of the dependent circuits varies, e.g., with transient loads on the circuits. For example, a voltage regulator is a circuit that provides a supply voltage at a substantially steady voltage, but with a current that varies based on the demand of the dependent circuits. Note that, by "substantially steady" voltages, it is meant that a supply voltage is, to the extent possible, sustained at or near a configured/given voltage, but that the voltage may vary in certain situations, such as when a transient load occurs on dependent circuits, etc.

Overview

The described embodiments include an arrangement of voltage regulators for supplying power at substantially steady voltages to a set of circuits on an integrated circuit chip. The arrangement of voltage regulators includes a single voltage regulator (or a "first stage" voltage regulator) external to the integrated circuit chip and two or more voltage regulators (or "second stage" voltage regulators) fabricated on the integrated circuit chip. The first stage voltage regulator provides an output voltage that is received as a supply voltage by each of the second stage voltage regulators. The second stage voltage regulators each provide local output voltage that is received as a supply voltage by a different subset of the circuits in the set of circuits. In the described embodiments, the first stage voltage regulator is a switching voltage regulator and the second stage voltage regulators are low-dropout regulators (LDO).

In the described embodiments, the first stage voltage regulator and the low-dropout regulators can be dynamically configured to provide various output voltages. For example, in some embodiments, the low-dropout regulators can be separately and independently configured to provide output voltages between 0 V and 1.2 V (or between other voltage values). For instance, the low-dropout regulators may be configured or reconfigured in response to the dynamic supply voltage demands of the corresponding subset of the circuits in the set of circuits. Continuing the example, the first stage voltage regulator can be configured to provide an output voltage between 0 V and 1.5 V (or between other voltage values) based on the dynamic supply voltage demands of the low-dropout regulators.

In some embodiments, the first stage voltage regulator is configured to provide an output voltage that is just high enough to meet the supply voltage needs of the low-dropout regulator(s) with the highest supply voltage needs. For example, if there are three low-dropout regulators, each of which needs a particular supply voltage to operate, the first stage voltage regulator provides the lowest output voltage (or within a given threshold or margin of the lowest output voltage) that enables all of the low-dropout regulators to operate.

In some embodiments, a controller (e.g., a system management controller, power controller, etc.) configures of some or all of the first stage voltage regulator and the low-dropout regulators to provide corresponding output voltages as described above. For example, the controller may monitor the subsets of circuits in the set of circuits to determine an activity or load of the subsets of the circuits in the set of circuits (i.e., to determine current or estimated future computational load, electrical power consumption needs, etc.). Based on the activity or load of the subsets of the circuits in the set of circuits, the controller determines a supply voltage to be provided to a given subset of the circuits in the set of circuits by the corresponding low-dropout regulator. For example, the controller can determine that a subset of the circuits in the set of circuits is to be or is being heavily used for computational operations, and can therefore determine that a higher output voltage (e.g., 1.2 V) is to be provided by the corresponding low-dropout regulator. As another example, the controller can determine that a subset of the circuits in the set of circuits is to be or is being lightly used for computational operations, and can therefore determine that a lower input voltage (e.g., 0.7 V) is to be provided by the corresponding low-dropout regulator. In some embodiments, the controller also dynamically determines an operating frequency of a clock or other element(s) in some all of the subsets of the circuits.

Numerous benefits are found when using the above-described arrangement of voltage regulators. For example, by using the low-dropout regulators to provide supply voltages to the subsets of the circuits in the set of circuits of the integrated circuit chip and the external first stage voltage regulator to provide a variable supply voltage to the low-dropout regulators, the described embodiments are able to adapt the supply voltages to the real-time operating conditions of the subsets of the circuits in the set of circuits. As another example, by using the single external first stage variable output voltage regulator and the low-dropout regulators fabricated on the integrated circuit chip, the described embodiments distribute the voltage regulators in a manner that requires less costly and complex off-chip circuitry. As yet another example, in comparison to certain existing arrangements of voltage regulators, cost can be saved on the package in which the integrated circuit chip is enclosed and the circuit board on which the package is mounted, because the electrical currents are provisioned between the two stages of voltage regulators according to more realistic operational scenarios. As yet another example, cost and design complexity is avoided with regard to the package and integrated circuit chip, because the dynamically selected output voltage from the first stage voltage regulator can be configured to meet the specific voltage requirement of the low-dropout regulators—providing improved power efficiency in specific workload scenarios. As yet another example, the low-dropout regulators are simpler than buck regulators, and so the monetary and design complexity cost of the described embodiments is lower than existing arrangements in which buck regulators are used. The described embodiments therefore improve the overall electrical power usage and general function of the integrated circuit chip and/or a system in which the integrated circuit is used.

System

Figure 1:
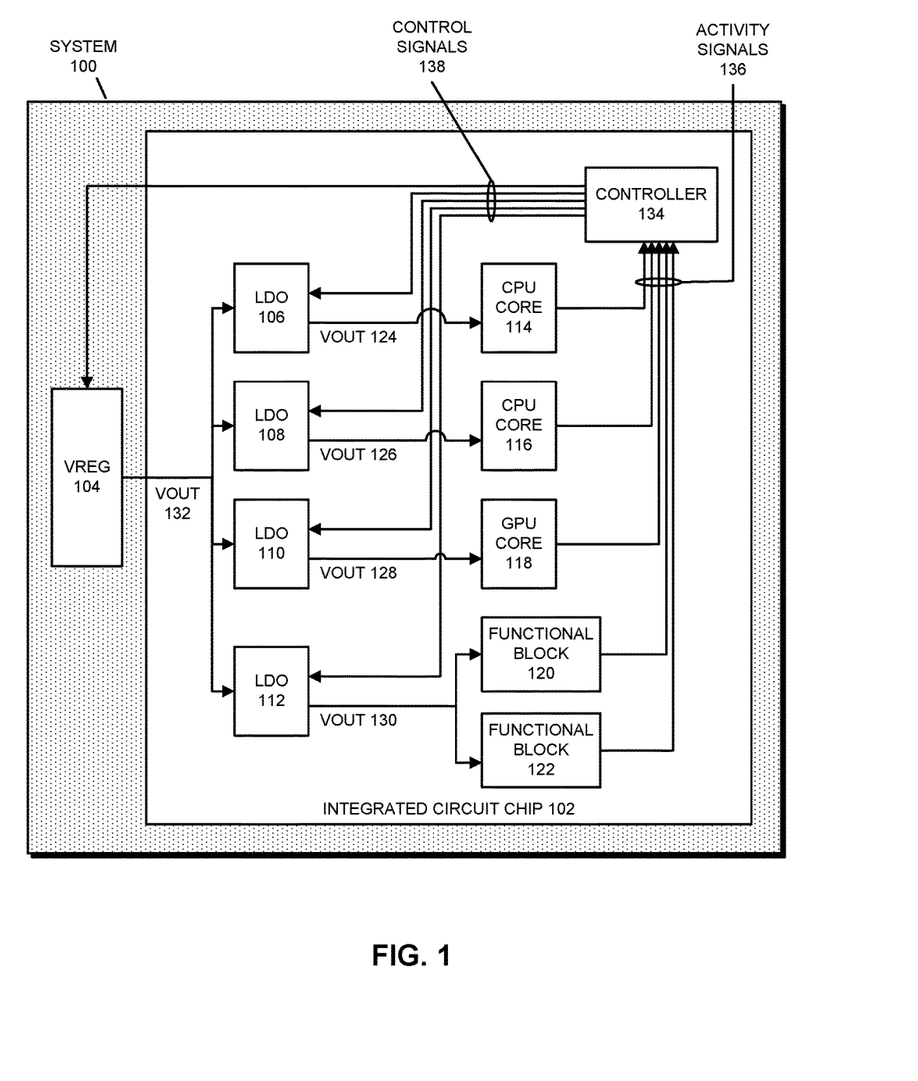
FIG. 1 presents a block diagram illustrating a system in accordance with some embodiments.

FIG. 1 presents a block diagram illustrating a system 100 in accordance with some embodiments. As can be seen in FIG. 1, system 100 includes an integrated circuit chip 102 coupled to a voltage regulator 104 ("VREG" 104). Voltage regulator 104 is a switching voltage regulator that provides electrical power at an output voltage, VOUT 132, which serves as a supply voltage to a set of low-dropout regulators (and possibly other circuits, which are not shown) on integrated circuit chip 102. For example, voltage regulator 104 may be a buck converter, a boost converter, or another type of switching voltage regulator. As described in more detail below, voltage regulator 104 may be dynamically configured and reconfigured to provide various output voltages during the operation of system 100.

Integrated circuit chip 102 is a semiconductor chip on which various circuit elements have been fabricated, including low-dropout regulators 106-112 ("LDO" 106-112), central processing unit cores 114-116 ("CPU core" 114-116), graphics processing unit core 118 ("GPU core" 118), functional blocks 120-122, and controller 134. CPU cores 114-116 are microprocessor cores that perform various computing operations. GPU core 118 is a graphics processor core that performs graphics processing and/or various other computing operations. Functional blocks 120-122 perform corresponding operations such as operations of a network processor, a memory controller and/or memory, etc.

CPU cores 114-116, GPU core 118, and functional blocks 120-122 are part of a "set" of circuits on integrated circuit chip 102, each of CPU cores 114-116, GPU core 118, and functional blocks 120-122 including a different "subset" of the circuits in the set of circuits. For example, CPU core 114 may be a first subset of the circuits in the set of circuits, CPU core 116 may be a second subset of the circuits in the set of circuits, GPU core 118 may be a third subset of the circuits in the set of circuits, and functional blocks 120-122 may be a fourth subset of the circuits in the set of circuits. As described below, a separate and different supply voltage may be provided to each subset of the circuits in the set of circuits in integrated circuit chip 102.

Low-dropout regulators 106-112 are linear voltage regulators that are configured to provide electrical power at substantially steady local output voltages, each of which serves as a supply voltage for a corresponding subset of the circuits in the set of circuits in integrated circuit chip 102. For example, low-dropout regulator 106 provides a local output voltage VOUT 124 that serves as a supply voltage for CPU core 114 (i.e., a first subset of the circuits in the set of circuits), low-dropout regulator 108 provides a local output voltage VOUT 126 that serves as a supply voltage for CPU core 116, low-dropout regulator 110 provides a local output voltage VOUT 128 that serves as a supply voltage for GPU core 118, and low-dropout regulator 112 provides a local output voltage VOUT 130 that serves as a supply voltage for functional blocks 120 and 122. As described in more detail below, low-dropout regulators 106-112 may be dynamically and individually configured and reconfigured to provide various local output voltages during the operation of system 100.

Note that the output voltages provided by low-dropout regulators 106-112 are called "local" in this description in order to distinguish these output voltages from the output voltage provided by voltage regulator 104. The local output voltages are otherwise simply output voltages that are provided to the subsets of the circuits in the set of circuits as described herein.

As described above, voltage regulator 104 and low-dropout regulators 106-112 can be dynamically configured to provide various output voltages. In some embodiments, system 100 performs the dynamic configuration by first determining a local output voltage to be provided by each low-dropout regulator 106-112. For example, a local output voltage may be determined for each low-dropout regulator 106-112 based on the present or estimated future activity or load of the corresponding subset of the circuits in the set of circuits, i.e., present or estimated future electrical power needs of the subset of the circuits. Continuing the example above, this means that the local output voltage, VOUT 124, for low-dropout regulator 106 can be determined based on the activity or load of CPU core 114, the output voltage for low-dropout regulator 108 can be determined based on the activity or load of CPU core 116, etc. Based on the local output voltage to be provided by each low-dropout regulator 106-112, the system determines an output voltage for voltage regulator 104 (which, again, supplies all of low-dropout regulators 106-112). The output voltage for voltage regulator 104 should be sufficiently high to enable the operation of low-dropout regulators 106-112, but is generally kept as low as possible to avoid unnecessary electrical power consumption, heat generation, etc. Thus, voltage regulator 104's output voltage is determined based on the highest-demanding low-dropout regulator 106-112, i.e., the low-dropout regulator 106-112 that will be providing the highest local output voltage. The system then configures voltage regulator 104 to provide the output voltage and configures low-dropout regulators 106-112 to provide the local output voltage (not necessarily in that order).

In some embodiments, the above-described dynamic configuration and reconfiguration of the output voltage and the local output voltages can be performed at various times during the operation of system 100. For example, at startup, as an activity or load of a subset of the set of circuits (again, CPU core 114, CPU core 116, etc.) changes, as a software program commences or changes phases of execution, every N milliseconds (where N is a numerical value), as a specified event occurs while system 100 is operating, when a physical parameter of some or all of system 100, e.g., temperature, sound, or vibration, reaches a specified level, etc. For example, system 100 may throttle or reduce the operating frequency of a clock in CPU core 114 that is overheating, leading to a reduced level of activity, and causing the reconfiguration/lowering of the local output voltage of low-dropout regulator 106 and/or the output voltage of voltage regulator 104. In some cases, frequency and voltage are selected as a pair and adjusted in tandem. As another example, functional block 122 may indicate a higher level of activity, causing the reconfiguration/raising of the local output voltage of low-dropout regulator 112 and/or the output voltage of voltage regulator 104.

Returning to FIG. 1, controller 134 is functional block that performs some or all of the operations herein described for configuring the output voltage provided by voltage regulator 104 and the local output voltages provided by low-dropout regulators 106-112 (and possibly other operations). For example, in some embodiments, controller 134 is a system controller, a power controller, a dedicated voltage regulator controller, and/or another functional block.

In some embodiments, controller 134 receives, retrieves, or otherwise acquires activity, load, or other operational information (generally, "activity information") from subset(s) of the circuits in the set of circuits, i.e., CPU core 114, functional block 120, etc., that can be used to determine the present or estimated future activity or load of some or all of the subsets of the circuits in the set of circuits. For example, controller 134 may receive, as the activity information, via activity signals 136 or another mechanism, a count or estimate of operations being or to be performed per second, an indicator of a number of instructions or operations in a queue, an operating temperature, a percentage of idle or busy time, an identification of a software (e.g., application, operating system routine, etc.) or hardware load being processed, and/or other information that can be used to characterize the present or estimated future activity or load of some or all of the subsets of the circuits in the set of circuits. In these embodiments, controller 134 may receive, retrieve, or otherwise acquire the activity information in various ways. For example, a subset of the set of circuits, e.g., CPU core 114, may write a value to a register or a shared memory location indicating the number of operations that were, are being, or are to be performed in the subset of the set of circuits. Controller 134 may then access/read the register or shared memory location to determine the operation information. As another example, controller 134 may communicate a request (e.g., via a system bus, signal lines such as activity signals 136, etc.) for the activity information to a subset of the circuits in the set of circuits and, in response, receive a return communication from the subset of the circuits in the set of circuits with the activity information. As another example, an operating system, hypervisor, and/or other software entity may communicate the activity information to controller 134 using a memory location/register, packet, instruction, or other communication mechanism.

In some embodiments, controller 134 "directly" determines the present or estimated future load or activity of the subset of the set of circuits based on activity information received from the subset of the set of circuits itself. For example, present or estimated future load or activity of CPU core 114 may be determined by controller 134 based on information that controller 134 received, retrieved, or otherwise acquired from CPU core 114. In some embodiments, controller 134 "indirectly" determines the present or estimated future load or activity of the subset of a set of circuits based on activity information received from one or more different subsets of the set of circuits. For example, controller 134 may receive activity information from CPU core 116 that indicates a present or estimated future load or activity of functional block 120. For instance, and assuming that functional block 120 is a memory, the activity information from CPU core 116 may indicate that a memory-intensive phase of operation—such as executing a software program that performs larger numbers of memory reads or writes—is now or will be entered by CPU core 116, leading to an increased load on functional block 120. In some embodiments, controller 134 performs a combination of direct and indirect determination of present or estimated future load or activity of the subsets of the set of circuits.

In some embodiments, controller 134 configures the output voltage for voltage regulator 104 and the local output voltages for low-dropout regulators 106-112, e.g., via control signals 138, based on one or more policies and/or rules. For example, given a particular activity or load level for one or more subsets of the circuits in the set of circuits, controller 134 may configure the output voltage and/or the local output voltages based on one or more rules that apply for the activity or load level, the average activity or load level, a minimum or maximum activity or load level in a given timeframe, etc. In some embodiments, the policies or rules are dynamically adjustable, such as by updating configuration files, register values, lookup tables or records, algorithms, etc. that indicate or control some or all of the policies and/or rules.

In some embodiments, controller 134 configures the voltages for voltage regulator 104 and/or low-dropout regulators 106-112 as part of an operation for setting or adjusting a voltage/frequency for some or all of the subsets of the set of circuits. For example, when entering a lower-power mode, controller 134 may set the voltage and/or frequency to a corresponding lower level, i.e., to a lower voltage and frequency.

In some embodiments, system 100 includes a mounting device (not shown) to which integrated circuit chip 102 and voltage regulator 104 are separately coupled (e.g., mounted, screwed, clamped, pressed, adhered, etc.) to provide stability and mechanical support. For example, the mounting device can be one or more of a circuit board, an active or inactive semiconductor interposer, a socket, a bracket, and/or another mechanical mounting device. In these embodiments, the mounting device may include traces, guides, pads, regions, etc. via which supply voltages such as VOUT 132 and other electrical signals, such as one or more of control signals 138, are communicated between voltage regulator 104 and integrated circuit chip 102.

In some embodiments, system 100 includes a package (not shown) in which integrated circuit chip 102 is enclosed or otherwise mounted. For example, the package may be a pin grid array package, a flat package, a small outline package, a ball grid array package, etc. As is typical with such packages, various pins, leads, solder bumps, regions, etc. and corresponding package-internal routing are provided for communicating electrical signals between integrated circuit chip 102 and devices (circuit boards, interposers, sockets, etc.) to which the package is mounted. In some embodiments, and differently than in some existing systems, the package does not include voltage regulator circuit elements. In other words, the circuit elements of the voltage regulators and the low-dropout regulators—not including pins, signal routes, traces, guides, regions, etc. used to route supply voltages through a package to integrated circuit chip 102—are either entirely external to the integrated circuit chip, as in voltage regulator 104, or entirely fabricated on the integrated circuit chip, as in low-dropout regulators 106-112.

Although various elements are shown in integrated circuit chip 102, in some embodiments, different elements are present in integrated circuit chip 102. Generally, integrated circuit chip 102 includes sufficient elements to perform the operations for configuring the local output voltages provided to different subsets of the circuits in a set of circuits by two or more low-dropout regulators and an output voltage provided to the two or more low-dropout regulators by an external voltage regulator.

System 100 can be, or can be included in, any electronic device that performs computational operations. For example, system 100 can be, or can be included in, electronic devices such as desktop computers, laptop computers, wearable computing devices, tablet computers, virtual or augmented reality equipment, smart phones, servers, network appliances, toys, audio-visual equipment, home appliances, controllers, vehicles, etc., and/or combinations thereof.

Configuring Voltages for Voltage Regulators

Figure 2:
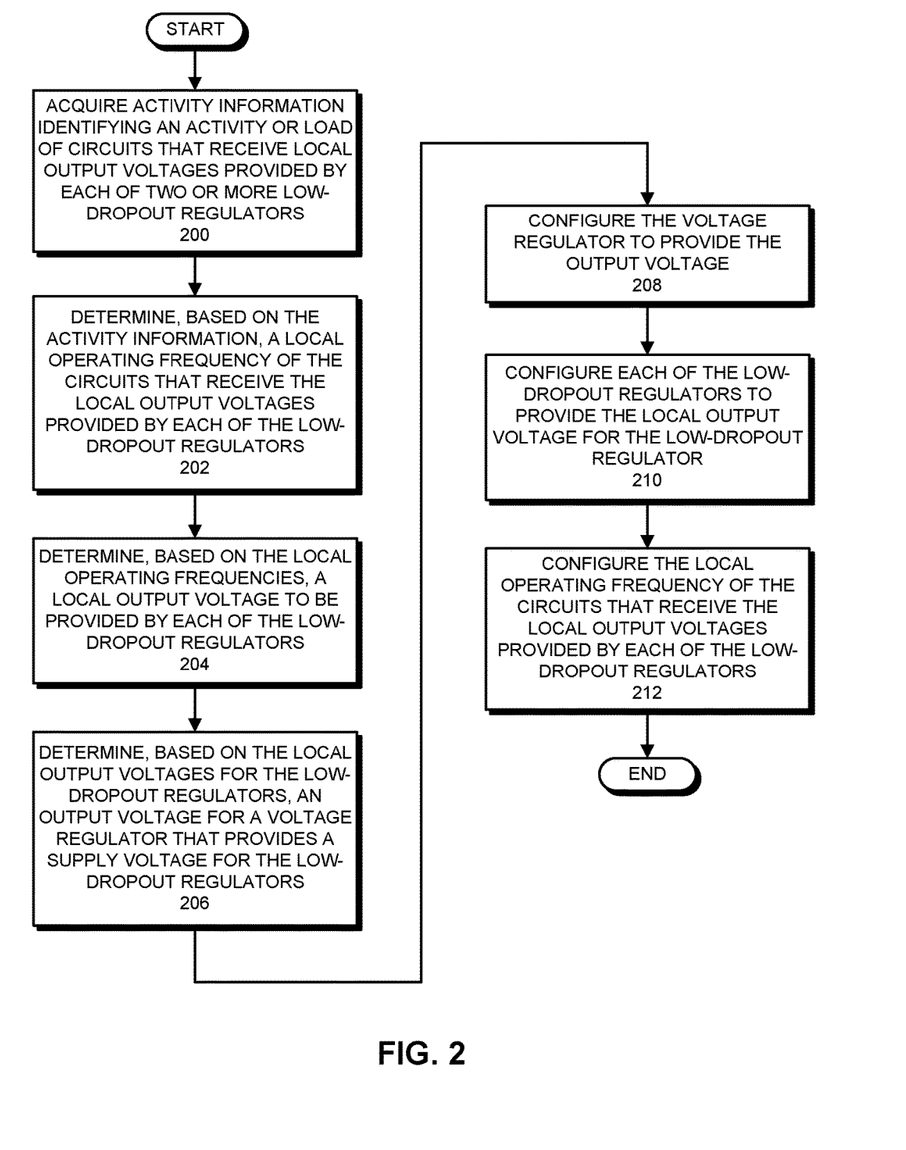
FIG. 2 presents a flowchart illustrating a process for configuring output voltage for a voltage regulator and the local output voltages for two or more low-dropout regulators in accordance with some embodiments.

As described above, the described embodiments perform operations for configuring the output voltage for voltage regulator 104 and the local output voltages for low-dropout regulators 106-112. FIG. 2 presents a flowchart illustrating a process for configuring output voltage for a voltage regulator and the local output voltages for two or more low-dropout regulators in accordance with some embodiments. Note that the operations shown in FIG. 2 are presented as a general example of functions performed by some embodiments. The operations performed by other embodiments include different operations and/or operations that are performed in a different order. Additionally, although certain mechanisms are used in describing the process (e.g., controller 134, etc.), in some embodiments, other mechanisms can perform the operations.

The process shown in FIG. 2 can be performed at any time during the operation of system 100. For example, the process can be performed at or near a startup, at one or more specified, periodic, or repeating time(s), upon the occurrence of specified event(s), when requested by one or more entities (operating systems, CPU cores, etc.), when a software program starts or changes execution phases, when a particular physical state (temperature, etc.) is encountered, and/or at other times. In other words, the local output voltages for low-dropout regulators 106-112 and the output voltage for voltage regulator 104 are dynamically configurable/selectable as system 100 operates. As described below, activity information is used, via local operating frequencies for circuits that receive local output voltages, to configure/select the output voltage and the local output voltages, resulting in output voltages and local output voltages that are configured for the voltage regulator and the low-dropout regulators based on real-time operating conditions in system 100. This can help to ensure that system 100 consumes less electrical power, operates at lower temperatures, etc., while also ensuring that system 100 responsively processes computational loads.

The process shown in FIG. 2 starts when controller 134 acquires activity information identifying an activity or load of subsets of the circuits in a set of circuits (e.g., functional block 122, etc.) that receive, as supply voltages, local output voltages provided by each of two or more low-dropout regulators (e.g., low-dropout regulator 112, etc.) (step 200). During this operation, controller 134 receives, retrieves, or otherwise acquires information that can be used to compute, identify, or estimate the activity or load of the subsets of the circuits in the set of circuits. For example, a CPU core whose supply voltage is supplied by one of the low-dropout regulators may update one or more performance counters, e.g., in registers or memory locations accessible to controller 134, and controller 134 may access/read the memory locations to acquire the activity information. As another example, controller 134 may request a memory bandwidth usage report or projection from a functional block that includes a memory, and receive in return a response indicating the memory bandwidth as the activity information. As another example, controller 134 may receive an indication, from a subset of the set of circuits, from an operating system, etc., of a software program that is to be executed by some or all of the subsets of the circuits in the set of circuits, the software program(s) having known execution profiles (e.g., memory-access heavy, graphics-intensive, etc.), identifiable execution phases (e.g., a computational phase followed by a write to memory phase), etc. as the activity information. As yet another example, controller 134 may receive an indication of an operating environment value (e.g., temperature, noise, fan speed, etc.) from a monitor for system 100 and use this as the activity information.

In some embodiments, controller 134 creates or derives the activity information. For example, controller 134 can monitor one or more system values (CPU core load levels, memory bus bandwidth usage, temperature, etc.) over time and compute averages, percentages, profiles, histograms, etc. As another example, controller 134 can compute or generate composite statistics or values, such as average instructions per CPU core per second, system-wide temperature patterns, etc. Generally, controller 134 performs operations for determining, based on one or more retrieved, received, or otherwise acquired values, activity information that identifies activity or load levels of subsets of the set of circuits.

Controller 134 then determines, based on the activity information, a local operating frequency of the circuits that receive the local output voltages provided by each of the low-dropout regulators (step 202). During this operation, controller 134 uses the activity information and one or more tables, reference values, algorithms, logical operations, and/or other operations to determine, based on the activity information, the local operating frequencies of the circuits that receive the local output voltages provided by each of the low-dropout regulators. For example, controller 134 can use lookup table(s) or other record(s) to determine that a local operating frequency for the some or all of the circuits is to be configured as a first value (e.g., 1.5 GHz, 900 MHz, or another value) when the activity information indicates that more than a specified percentage of idle time is or has been occurring for corresponding circuits, and is otherwise to be configured as a second value (e.g., 2.5 GHz, 3 GHz, or another value). As another example, controller 134 may compute, using an operating temperature acquired from some or all of the circuits (or elsewhere) as an input to an algorithm having one or more mathematical, logical, and/or bitwise operations, a local frequency for some or all of the circuits. For instance, controller 134 may, using the algorithm, scale a present local operating frequency for some or all of the circuits to a new local operating frequency in proportion to the present operating temperature.

In some embodiments, the one or more tables, reference values, algorithms, logical operations, and/or other operations that is/are used to determine, based on the activity information, the local operating frequencies are dynamically configurable. For example, in an embodiment that uses one or more tables, the one or more tables may be updated or replaced by an operating system or software program, a user, controller 134, one of the subsets of the circuits, etc. as system 100 operates. In this way, the local operating frequencies determined in step 202 can be changed or adjusted over time—which can help ensure that the system uses desirable local operating frequencies for the circuits that receive the local output voltages provided by each of the low-dropout regulators. In some embodiments, the dynamic configuration of the one or more tables, reference values, algorithms, logical operations, and/or other operations follows one or more general policies or rules, e.g., maintain a particular average time of completion for specified computational operations, maintain an average temperature within system 100, etc. In these embodiments, the dynamic configuration may occur every so often (e.g., every N milliseconds, etc.) to ensure that, given or based on the dynamic configuration, the general policies or rules are being met. In some embodiments, the local operating frequencies for each of the circuits can be set to different values.

Controller 134 then determines, based on the determined local operating frequency of the circuits that receive the local output voltages provided by each of the low-dropout regulators, a local output voltage for each of the low-dropout regulators (step 204). During this operation, controller 134 uses one or more tables, reference values, algorithms, logical operations, and/or other operations to determine, based on the corresponding local operating frequency, the local output voltage for each of the low-dropout regulators. For example, controller 134 can perform lookup(s) in one or more lookup table(s) or other record(s) to determine a local output voltage that is associated with each corresponding local operating frequency. For instance, assuming that the determined local operating frequency of the circuits that receive the local output voltages provided by one of the low-dropout regulators is 2.5 GHz, the local output voltage for the corresponding low-dropout regulator may be set to 1.2 V, 1.5 V, or another voltage value. In this way, a separate local output voltage is determined for each low-dropout regulator based on the local operating frequency of the corresponding circuits.

In some embodiments, the one or more tables, reference values, algorithms, logical operations, and/or other operations that is/are used to determine, based on the local operating frequencies, the local output voltages are dynamically configurable. For example, in an embodiment that uses one or more tables, the one or more tables may be updated or replaced by an operating system or software program, a user, controller 134, one of the subsets of the circuits, etc. as system 100 operates. In this way, the local output voltages determined in step 204 can be changed or adjusted over time—which can help ensure that the system uses desirable voltages for the circuits that receive the local output voltages provided by each of the low-dropout regulators. In some embodiments, the dynamic configuration of the one or more tables, reference values, algorithms, logical operations, and/or other operations follows one or more general policies or rules, e.g., maintain a particular average time of completion for specified computational operations, maintain an average temperature within system 100, etc. In these embodiments, the dynamic configuration may occur every so often (e.g., every N milliseconds, etc.) to ensure that, given or based on the dynamic configuration, the general policies or rules are being met.

Controller 134 next determines, based on the local output voltages for the low-dropout regulators, an output voltage for a voltage regulator (e.g., a switching voltage regulator such as voltage regulator 104) (step 206). During this operation, controller 134, using a lookup table, an algorithm, and/or other operation, determines an output voltage to be provided by the voltage regulator that is sufficiently high to enable the proper operation of each/all of the low-dropout regulators, but that is also not substantially higher than necessary. Generally, the low-dropout regulators need, to enable correct operation, an input voltage that is equal to or higher than the local output voltage. Controller 134 can therefore, in some embodiments, use an algorithm such as an addition (e.g., adding an offset value to the highest low-dropout regulator output voltage, such as 0.2 V, 0.3 V, etc.) or a multiplication by a scaling value (e.g., multiplying the highest low-dropout regulator output voltage by a scaling value, such as 1.1, 1.2, etc.) to determine the output voltage for the voltage regulator. Controller 134 can, in some embodiments, perform a lookup in a table in which each of a set of usable/permissible local output voltage values is associated with a corresponding output voltage for the voltage regulator to acquire the output voltage. Controller 134 may also simply set the output voltage equal to the highest of the local output voltages.

In some embodiments, the lookup table, algorithm, and/or other operation that is/are used to determine the output voltage for the voltage regulator are dynamically configurable. For example, in an embodiment that uses a lookup table, the lookup table may be updated or replaced by an operating system or software program, a user, controller 134, one of the subsets of the circuits, etc. as system 100 operates. In this way, the output voltage determined in step 204 can be changed or adjusted over time—which can help ensure that the system uses desirable output voltages for configuring the voltage regulator. In some embodiments, the dynamic configuration of the lookup table, algorithm, and/or other operation follows one or more general policies or rules, e.g., maintain a particular average time of completion for specified computational operations, maintain an average temperature within system 100, etc. In these embodiments, the dynamic configuration may occur every so often (e.g., every N milliseconds, etc.) to ensure that, given or based on the dynamic configuration, the general policies or rules are being met.

Controller 134 then configures the voltage regulator to provide the output voltage (step 208). During this operation, controller 134, e.g., via a corresponding one of control signals 138, sets, adjusts, or otherwise causes circuit elements in the voltage regulator to commence providing/outputting the output voltage. For example, controller 134 can set or adjust a bias or reference voltage that is supplied to circuit elements of the voltage regulator to cause those circuit elements to commence providing the output voltage. As another example, controller 134 can configure elements of the voltage regulator, such as amplifiers, resistors, capacitors, inductors, etc. to cause the voltage regulator to commence providing the output voltage. As another example, controller 134 can set a value in a register or memory element that is used by one or more control circuits or elements for the voltage regulator to determine how to set the output voltage for the voltage regulator, thereby causing the voltage regulator to commence providing the output voltage.

Controller 134 then configures each of the low-dropout regulators to provide the local output voltage for the low-dropout regulator (step 210). During this operation, controller 134, e.g., via corresponding control signals 138, sets, adjusts, or otherwise causes circuit elements in the low-dropout regulator to commence providing/outputting the corresponding local output voltage. For example, controller 134 can set a bias or reference voltage that is supplied to circuit elements of a low-dropout regulator to cause those circuit elements to commence providing the output voltage. As another example, controller 134 can configure elements of a low-dropout regulator, such as amplifiers, resistors, capacitors, etc. to cause the low-dropout regulator to commence providing the output voltage. As another example, controller 134 can set a value in a register or memory element that is used by one or more control circuits or elements for a low-dropout regulator to determine how to set the output voltage for the low-dropout regulator, thereby causing the low-dropout regulator to commence providing the output voltage.

For the example in FIG. 2, the reconfiguration of the voltage regulator to provide the output voltage (in step 208) and the low-dropout regulators to provide the corresponding local output voltages (in step 210) is performed in such a way that unnecessary disruption of local output voltages is avoided during the configuration operation. Generally, this means that the output voltage of the voltage regulator is not reduced below an output voltage that is sufficient for all of the low-dropout regulators to continue providing a previous local output voltage—until the low-dropout regulators are also reconfigured to provide lower local output voltages. For example, the reconfiguration may be atomic or performed at substantially the same time for the voltage regulator and the low-dropout regulators, so that the low-dropout regulators demonstrate reduced ill effects (i.e., interruptions or spikes in local output voltage) from the reconfiguration. As another example, the order of steps 208-210 may be reversed so that a low-dropout regulator's local output voltage is reduced/configured before the output voltage of the voltage regulator is correspondingly reduced/configured.

Controller 134 then configures the local operating frequency of the circuits that receive the local output voltages provided by each of the low-dropout regulators (step 212). During this operation, controller 134 directly or indirectly adjusts, updates, or otherwise configures the local operating frequency of the circuits. For example, controller 134 may adjust (i.e., increase or decrease) the clock frequency of one or more clocks to/with which operations in the circuits are synchronized or by which the operations are controlled, may configure the circuits to accept input from another control circuit (a higher or lower frequency clock, etc.), and/or otherwise update the local operating frequency of the circuits.

Although the act of "configuring" voltages and frequencies is described, the configuring includes leaving output voltages, local output voltages, and frequencies unchanged when no change is desirable. For example, when the output voltage and/or local output voltages are already properly configured in accordance with the output voltages and/or local output voltages determined in steps 200-206, steps 208 and/or 210 may consist of leaving the present output voltage and/or local output voltage unchanged.

Figure 3A:
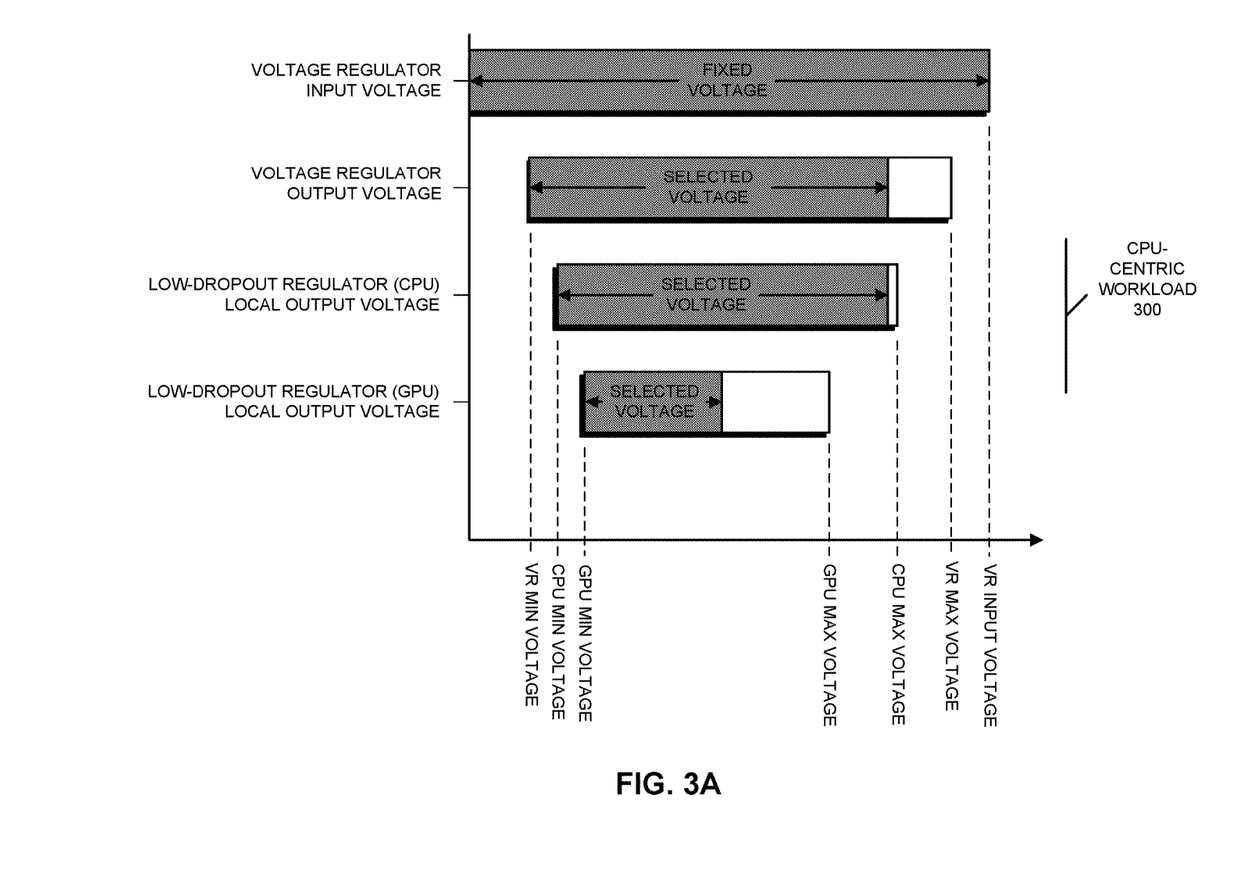
FIG. 3A presents a block diagram of a system workload and corresponding voltage regulator and low-dropout regulator settings in accordance with some embodiments.
Figure 3B:
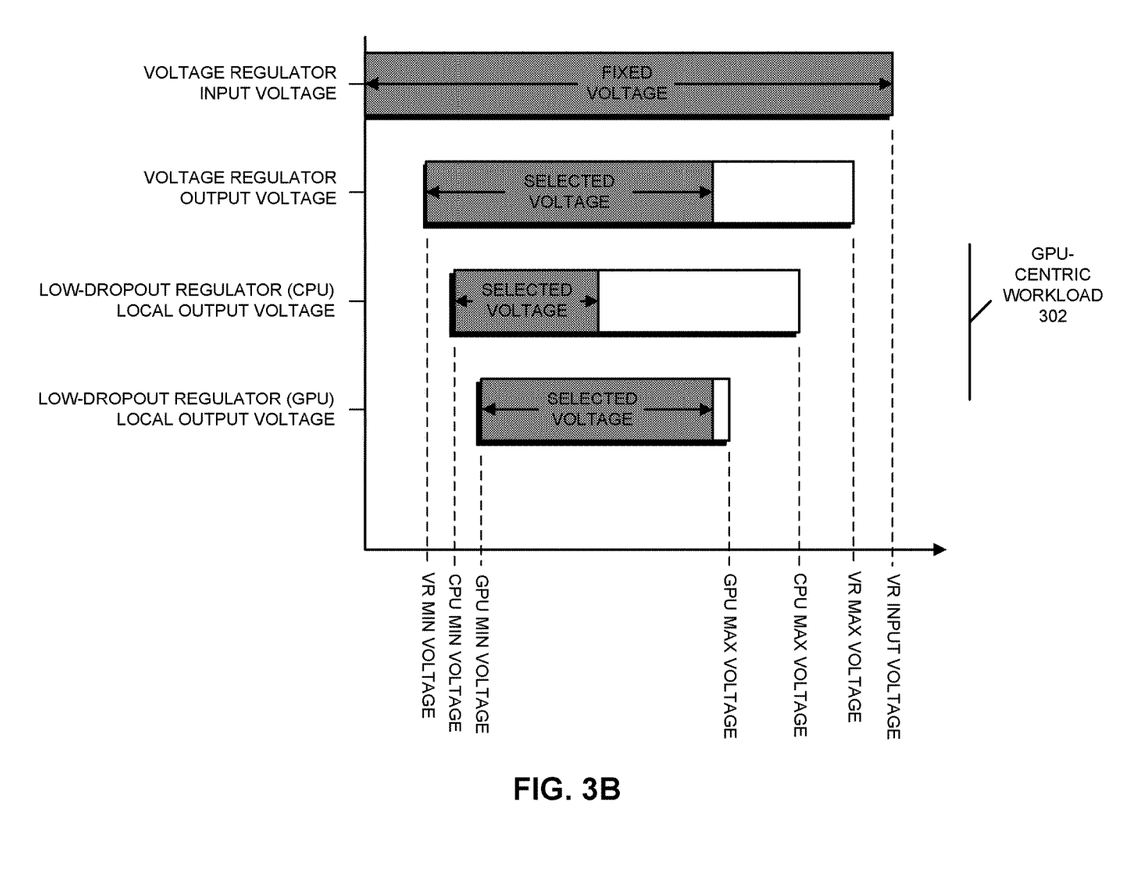
FIG. 3B presents a block diagram of a system workload and corresponding voltage regulator and low-dropout regulator settings in accordance with some embodiments.
Figure 3C:
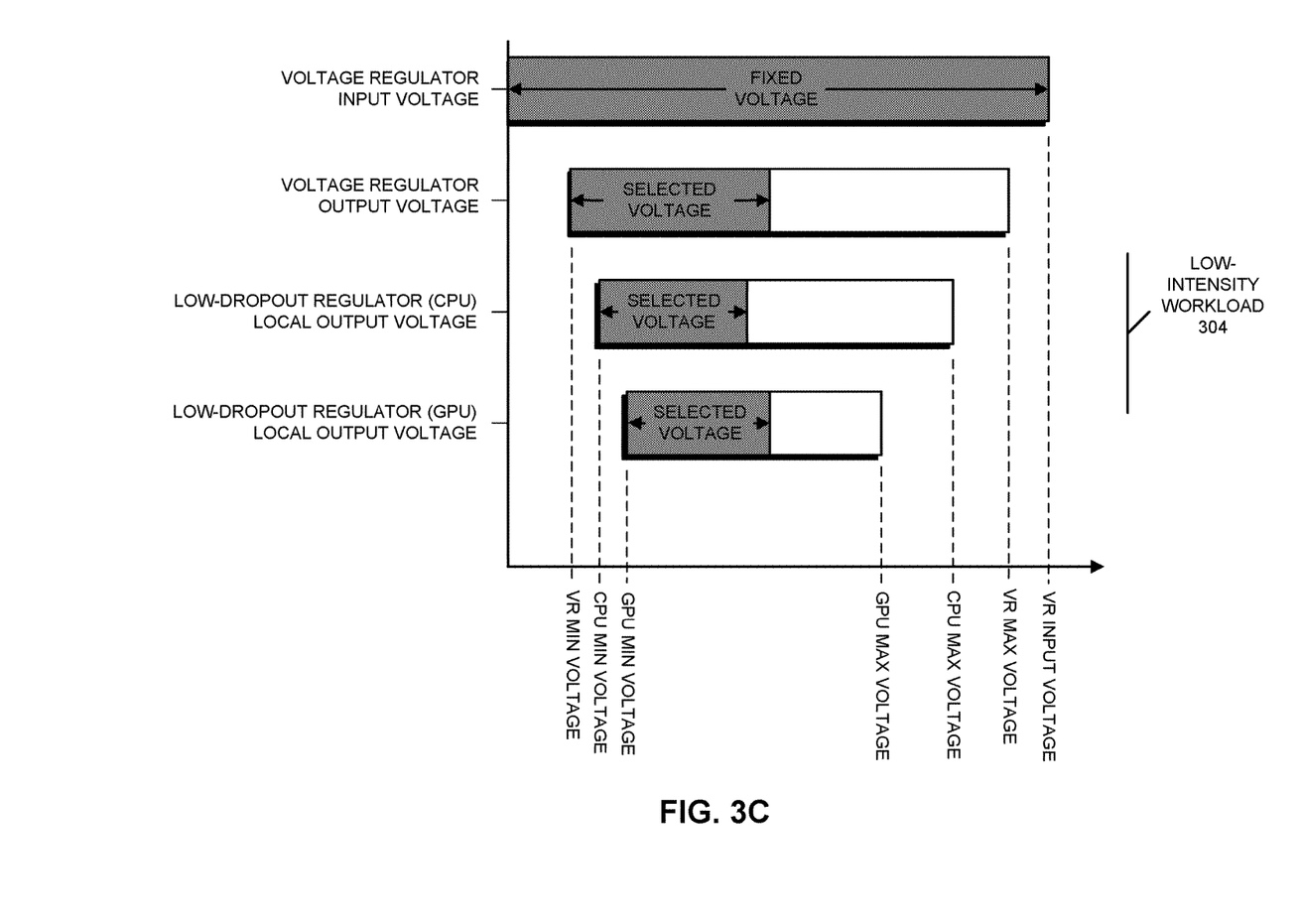
FIG. 3C presents a block diagram of a system workload and corresponding voltage regulator and low-dropout regulator settings in accordance with some embodiments.

FIGS. 3A-3C present block diagrams of a number of system workloads and corresponding voltage regulator and low-dropout regulator settings in accordance with some embodiments. Generally, the examples shown in FIGS. 3A-3C illustrate the output voltage and two local output voltages after the operations of FIG. 2 have been performed for each of three different workloads. Although a particular embodiment is shown in FIGS. 3A-3C, in some embodiments, different voltages may be used.

For the operations in FIGS. 3A-3C, the system workloads represent workloads and selected voltages that may occur specific points in time during the operation of the system.

These are not, however, the only workloads and/or selected voltages that may occur in system 100. During operation of system 100, the workloads and selected voltages may change from moment to moment, depending on the particular computational load of system 100 and/or other factors. As described herein, controller 134 dynamically configures the output voltages and local output voltages based at least in part on the workloads. In addition, the fixed input voltage for the voltage regulator (e.g., voltage regulator 104) is shown in all of FIGS. 3A-3C. The fixed voltage is the supply voltage (e.g., from a power supply, a battery, or another source) that is provided to the voltage regulator. Also, the minimum and maximum output voltages for the voltage regulator and the low-dropout regulators are shown using labels below the horizontal axis. For example, the voltage regulator's minimum voltage is labeled "VR MIN VOLTAGE" and the maximum voltage is labeled "VR MAX VOLTAGE." Note that the fixed, minimum, and maximum voltage values may be any values and are presented simply as an illustration (i.e., not shown to scale).

For CPU-centric workload 300 in FIG. 3A, the CPU (e.g., CPU core 114) is active and experiencing a load, but the GPU (e.g., GPU core 118) is only minimally loaded. The local output voltages being provided by the corresponding low-dropout regulators (e.g., low-dropout regulators 106 and 110) are based on the corresponding activity/load, so that the corresponding low-dropout regulator is providing the CPU with a local output voltage that is nearer to the maximum voltage (as shown by the darkened portion of the bar in FIG. 3A) and the corresponding low-dropout regulator is providing the GPU with a local output voltage that is nearer to the minimum voltage. As can be seen, the output voltage provided by the voltage regulator is substantially equal to (i.e., slightly above, if not equal to) the local output voltage of the CPU low-dropout regulator, thereby providing a sufficient supply voltage to enable the CPU low-dropout regulator. The GPU low-dropout regulator is set to a lower local output voltage, which leads to some power loss (due to the nature of the low-dropout regulator and the difference between the output voltage and the GPU local output voltage), but the power loss is minor due to the lower level of electrical current being drawn by the GPU.

For GPU-centric workload 302 in FIG. 3B, the GPU is active and experiencing a load and the CPU is active, but not fully loaded. The local output voltages being provided by the corresponding low-dropout regulators are based on the corresponding activity/load, so that the corresponding low-dropout regulator is providing the GPU with a local output voltage that is nearer to the maximum voltage and the corresponding low-dropout regulator is providing the CPU with a local output voltage that is in the middle of the voltage range. As can be seen, the output voltage provided by the voltage regulator is substantially equal to the local output voltage of the GPU low-dropout regulator, thereby providing a sufficient supply voltage to enable the GPU low-dropout regulator. The CPU low-dropout regulator is set to a lower local output voltage, which leads to some power loss (again, due to the nature of the CPU low-dropout regulator and the difference between the output voltage and the CPU local output voltage), but the power loss is not unmanageable due to the lower level of electrical current being drawn by the CPU.

For low-intensity workload 304 in FIG. 3C, both the CPU and GPU are active, but only minimally loaded. The local output voltages being provided by the corresponding low-dropout regulators are based on the corresponding activity/load, so that the corresponding low-dropout regulators are both providing the CPU and GPU, respectively, with a local output voltage that is nearer to the minimum voltage. As can be seen, the output voltage provided by the voltage regulator is also nearer to the minimum voltage, which is to provide a sufficient supply voltage to enable the GPU low-dropout regulator.

Manufacturing a System

Figure 4:
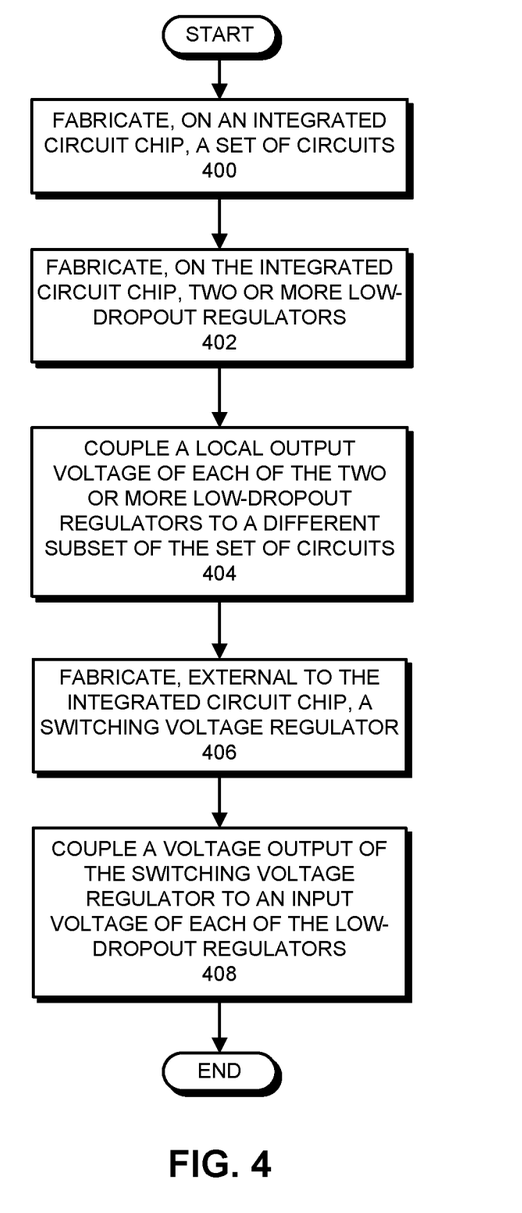
FIG. 4 presents a flowchart illustrating a process for fabricating a system in accordance with some embodiments.

FIG. 4 presents a flowchart illustrating a process for manufacturing a system (e.g., system 100 as shown in FIG. 1) in accordance with some embodiments. Note that the operations shown in FIG. 4 are presented as a general example of functions performed by some embodiments. The operations performed by other embodiments include different operations and/or operations that are performed in a different order.

The process shown in FIG. 4 starts when a set of circuits (i.e., integrated circuits) is fabricated on an integrated circuit chip (step 400). During this operation, various circuits, e.g., CPU core 114, functional block 120, etc., are fabricated on the integrated circuit chip—which may be a new semiconductor die or a semiconductor die with one or more other devices or features already present—using known semiconductor fabrication processes, such as doping or ion implantation, etching, deposition of various materials, photolithographic patterning via one or more masks, etc.

Next, two or more low-dropout regulators are fabricated on the integrated circuit chip (step 402). As with the circuits in step 400, the low-dropout regulators are fabricated on the integrated circuit chip using known semiconductor fabrication processes.

Local output voltage outputs of each of the two or more low-dropout regulators are then coupled (as a supply voltage) to different subset of the set of circuits (step 404). During this operation, a signal line, e.g., one or more traces, guides, etc. is coupled between the output pin, contact, etc. for the local output voltage of each low-dropout regulator and an input pin, contact, etc. for the supply voltage input for the corresponding subset of the set of circuits.

A switching voltage regulator is then fabricated external to the integrated circuit chip (step 406). During this operation, various discrete and/or integrated circuit elements are fabricated, e.g., using known semiconductor fabrication processes, and coupled together to form the switching voltage regulator.

A voltage output of the switching voltage regulator is then coupled to a voltage input of the low-dropout regulators (step 408). During this operation, an output voltage pin, connector, lead, etc. of the switching voltage regulator is coupled, via one or more traces, wires, guides, etc. to a pin, region, etc. of the integrated circuit chip that serves as an off-chip interface for the voltage input of the low-dropout regulators.

In some embodiments, a computing device (e.g., system 100, and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations. A computer-readable storage medium can be any device, medium, or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), system management controllers, power controllers, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., integrated circuit chip 102, controller 134, and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuit elements that perform the described operations. For example, the circuit elements may include integrated circuits, discrete circuit elements, etc. In some embodiments, the circuits in a functional block include circuits that execute program code (e.g., microcode, firmware, applications, etc.) to perform the described operations. For example, a functional block may include one or more processing pipelines, compute units, dedicated processing circuits, etc.

In this description, time may be referred to in general terms. For example, "every N milliseconds" or the like. Despite the repeated use of N as a variable, the general references do not necessarily describe the same amount of time in each case—there may be different times intended for some or all of the general references.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An apparatus that controls voltages, comprising:
   an integrated circuit chip comprising a set of circuits;
   a switching voltage regulator separate from the integrated circuit chip;
   a plurality of low dropout (LDO) regulators fabricated on the integrated circuit chip, wherein the switching voltage regulator provides an output voltage that is received as an input voltage by each of the plurality of LDO regulators and wherein each LDO regulator of the plurality of LDO regulators provides a local output voltage, each local output voltage received as a local input voltage by a different subset of circuits in the set of circuits; and
   a controller configured to:
      for each LDO regulator, identify the local output voltage to be provided by the LDO regulator;
      based on the local output voltage to be provided by each of the LDO regulators, identify the output voltage to be provided by the switching voltage regulator; and
      configure the switching voltage regulator to provide the output voltage and each LDO regulator to provide the local output voltage to be provided by the LDO regulator.

2. The apparatus of claim 1, wherein identifying the local output voltage to be provided by each LDO regulator comprises:
   acquiring activity information for identifying an activity or load of the subset of circuits that receives the local output voltage provided by the LDO regulator; and
   based at least in part on the activity information, identifying the local output voltage.

3. The apparatus of claim 2, wherein acquiring the activity information comprises at least one of:
   acquiring some the activity information from the subset of circuits that receives the local output voltage provided by the LDO regulator; and
   acquiring the activity information from one or more subsets of circuits other than the subset of circuits that receive the local output voltage provided by the LDO regulator.

4. The apparatus of claim 1, wherein, based on the local output voltage to be provided by each of the LDO regulators, identifying the output voltage to be provided by the switching voltage regulator comprises:
   determining a maximum local output voltage to be provided by a given LDO regulator among the plurality of LDO regulators; and
   identifying the output voltage as a voltage that enables the given LDO regulator to provide the maximum local output voltage.

5. The apparatus of claim 1, wherein a first of the subsets of circuits comprises at least one central processing unit (CPU) and a second of the subsets of circuits comprises at least one graphics processing unit (GPU).

6. The apparatus of claim 1, further comprising a mounting device, wherein the switching voltage regulator and the integrated circuit chip are separately coupled to the mounting device.

7. The apparatus of claim 1, further comprising a package in which the integrated circuit chip is packaged, the package not including voltage regulator circuit elements.

8. The apparatus of claim 1, wherein the switching voltage regulator is buck converter.

9. A method for controlling voltages for an integrated circuit chip comprising a set of circuits, the method comprising, by a controller:
   identifying a corresponding local output voltage to be provided by each low-dropout regulator (LDO) of a plurality of LDO regulators that are fabricated on the integrated circuit chip, wherein each LDO regulator of the plurality of LDO regulators provides a local output voltage that is received as a local input voltage by a different subset of circuits in the set of circuits;
   identifying, based on the local output voltage to be provided by each of the LDO regulators, an output voltage to be provided by a switching voltage regulator that is separate from the integrated circuit chip, wherein the output voltage provided by the switching regulator is received as an input voltage by each of the plurality of LDO regulators; and
   configuring the switching voltage regulator to provide the output voltage and each LDO regulator to provide the local output voltage to be provided by the LDO regulator.

10. The method of claim 9, further comprising:
   performing some or all of the operations of identifying the local output voltages and the output voltage and configuring the voltage regulator and the low-dropout regulators at one or more times during an operation of the integrated circuit chip.

11. The method of claim 10, wherein the one or more times comprise some or all of:
   at a startup of the integrated circuit chip;
   after encountering a specified event; and
   based on an execution state of one or more software programs that are executed by one or more subsets of circuits.

12. The method of claim 9, wherein identifying the corresponding local output voltage to be provided by each LDO regulator comprises:
   acquiring activity information for identifying an activity or load of the subset of circuits that receive the local output voltage provided by the LDO regulator; and
   based at least in part on the activity information, identifying the local output voltage.

13. The method of claim 12, wherein identifying the local output voltage based at least in part on the activity information comprises one or more of:
   using the activity information to perform a lookup for the local output voltage in a lookup table or other record, the lookup table or other record relating various types of activity information to corresponding local output voltages; and
   using the activity information as an input to an algorithm that produces a result indicating the local output voltage, the algorithm including one or more mathematical or logical operations for producing the result.

14. The method of claim 12, wherein acquiring the activity information comprises at least one of:
   acquiring the activity information from the subset of circuits that receives the local output voltage provided by the LDO regulator; and
   acquiring the activity information from one or more subsets of circuits other than the subset of circuits that receives the local output voltage provided by the LDO regulator.

15. The method of claim 9, wherein identifying, based on the local output voltage to be provided by each of the LDO regulators, the output voltage to be provided by the switching voltage regulator comprises:
   determining a maximum local output voltage to be provided by a given LDO regulator among the plurality of LDO regulators; and
   identifying the output voltage as a voltage that enables the given LDO regulator to provide the maximum local output voltage.

16. The method of claim 9, wherein configuring the switching voltage regulator to provide the output voltage and each LDO regulator to provide the local output voltage to be provided by the LDO regulator comprises:
   configuring circuit elements associated with the switching voltage regulator to commence providing the output voltage; and
   configuring circuit elements associated with each low-dropout regulator to commence providing the corresponding local output voltage.

17. The method of claim 9, further comprising, when configuring the switching voltage regulator to provide the output voltage and each LDO regulator to provide the local output voltage to be provided by the LDO regulator:
   selecting an order in which the switching voltage regulator and the low-dropout regulators are configured based on a relationship between the output voltage and the local output voltage to be provided by each LDO, so that a disruption of the local output voltage provided by the low-dropout regulators is reduced.

18. The method of claim 9, wherein a first of the subsets of circuits comprises at least one central processing unit (CPU) and a second of the subsets of circuits comprises at least one graphics processing unit (GPU).

19. The method of claim 9, wherein the switching voltage regulator is buck converter.

* * * * *